United States Patent
Bonnell

(10) Patent No.: US 7,305,359 B2
(45) Date of Patent: Dec. 4, 2007

(54) HEALTHCARE CASH MANAGEMENT ACCOUNTING SYSTEM

(75) Inventor: Joanne R. Bonnell, Broomall, PA (US)

(73) Assignee: Siemens Medical Solutions Health Services Corporation, Malvern, PA (US)

( * ) Notice: Subject to any disclaimer, the term of this patent is extended or adjusted under 35 U.S.C. 154(b) by 0 days.

(21) Appl. No.: 10/614,649

(22) Filed: Jul. 7, 2003

(65) Prior Publication Data

US 2004/0117211 A1 Jun. 17, 2004

Related U.S. Application Data

(60) Provisional application No. 60/432,765, filed on Dec. 12, 2002.

(51) Int. Cl.
*G06Q 40/00* (2006.01)

(52) U.S. Cl. .............................. 705/30; 705/3

(58) Field of Classification Search ............ 705/2, 705/3, 30
See application file for complete search history.

(56) References Cited

U.S. PATENT DOCUMENTS

| | | | |
|---|---|---|---|
| 4,667,292 A | 5/1987 | Mohlenbrock et al. | |
| 4,858,121 A * | 8/1989 | Barber et al. .............. | 705/2 |
| 5,191,522 A | 3/1993 | Bosco et al. ............... | 364/401 |
| 5,390,113 A * | 2/1995 | Sampson ..................... | 705/30 |
| 5,704,044 A | 12/1997 | Tarter et al. ................ | 395/204 |
| 6,108,641 A | 8/2000 | Kenna et al. ................. | 705/35 |
| 6,138,102 A | 10/2000 | Hinckley, Jr. ............... | 705/4 |
| 6,208,974 B1 | 3/2001 | Campbell et al. ............ | 705/3 |
| 2004/0153405 A1 * | 8/2004 | Millary et al. ............... | 705/40 |

OTHER PUBLICATIONS imagevision.net/HealthPay24.htm posted on the Internet Aug. 3, 2002 (found using WayBack Machine at www.archive.com), 5 pages.*
International Search Report.

* cited by examiner

*Primary Examiner*—R Weisberger
(74) *Attorney, Agent, or Firm*—Alexander J. Burke

(57) ABSTRACT

An automatic cash accounting system for use in a healthcare enterprise includes a message processor and a data processor. The message processor receives message data including an income amount value, representing cash income received during a time period, an associated income source identifier, and a patient identifier. The income source identifier identifies a department internal to the healthcare enterprise providing the associated income amount value. The patient identifier identifies a patient. The data processor processes the received message data to identify an income account associated with the department based on the income source identifier, and updates the identified income account with the income amount value to indicate the income amount value received by the identified income account during the time period. The data processor identifies a patient account associated with a patient based on the patient identifier, and updates the patient account with the income amount value to indicate the income amount received by the patient account during the time period. The data processor collates and combines data from the income accounts and the patient accounts to provide a first income amount total value and/or a second income total value, respectively, representing combined cash income for the departments and for the patients, respectively, during the time period.

29 Claims, 5 Drawing Sheets

200
Healthcare Cash Management Accounting Process

400
Month End Cash Reporting Process For A Single Income Source

401

402
Poll cash register to produce the monthly cash report.

403
Monthly Cash report Benefits:
•Bank Statement Reconciliation
•Cash Forecasting
•Insurance Case Mix Ratios
•Patient Cash Payments vs. Credit Card Payments
•Cash received vs. cash posted 500
Month End Cash Reporting Process For Multiple Income Sources 501 Assigning a different code to each income source, which is used to separate each income source totals, extracting the totals from each income source, and merging the totals to produce a combined income report for the healthcare enterprise.

HEALTHCARE CASH MANAGEMENT ACCOUNTING SYSTEM

CROSS-REFERENCE TO RELATED APPLICATIONS

The present application is a non-provisional application of provisional application having ser. No. 60/432,765 filed by Joanne Bonnell on Dec. 12, 2002.

FIELD OF THE INVENTION

The present invention generally relates to healthcare information systems. More particularly, the present invention relates to a healthcare cash management accounting system.

BACKGROUND OF THE INVENTION

One kind of administrative system employed by healthcare enterprises is an accounting system. The accounting system includes, without limitation, accounts payable, accounts receivable, auditing, cash management, inventory control, order entry, purchase order, point of sale, payroll. Cash management further includes, without limitation, collections and deposits, payments and disbursements, and reconciliation of monthly statements, transactions, accounts, and balances.

Healthcare enterprises, such as hospitals, receive income by providing a community of people various types of inpatient and outpatient medical services. For example, approximately eighty percent (80%) of a typical hospital's income comes from medical insurance reimbursements and patient out-of-pocket co-payments and deductibles.

In addition to insurance reimbursements and patient income, a healthcare enterprise may also receive income from an employee cafeteria, a parking garage, a gift shop, a coffee shop, as well as, income from other entity affiliates such as physician practices, foundations, education and research, for example.

Typically, accounting staff manually gathers cash information from various revenue producing departments in the healthcare enterprise for entering into an accounting system. Usually, the cash information that is collected is not obtained on the same day that it is deposited, which creates difficulty in balancing accounts and underestimates month end receivables. Further, reductions in government healthcare reimbursements and increasing patient out-of-pocket healthcare costs each contribute to a growing need for an integrated cash control system.

In view of the foregoing, would be desirable for healthcare enterprises to know where their cash is coming from to support various accounting analysis such as projecting future income trends and managing cash flow. It would be desirable for healthcare enterprises to have a centralized mechanism that is capable of managing the collection, balancing, accounting, and reporting of cash that also incorporates appropriate cash controls. It would also be desirable for healthcare enterprises to receive daily and monthly reporting of cash receipts, and to balance cash received with monthly bank statements. It would be desirable for the cash management system to be electronically implemented to permit efficient, timely, secure, automated, and accurate tracking and control of the cash received. Further, it would be desirable to provide a controlled debit-to-cash journal entry for healthcare enterprises. Accordingly, there is a need for an accounting system having cash management for a healthcare enterprise.

SUMMARY OF THE INVENTION

According to an aspect of the present invention, an automatic cash accounting system for use in a healthcare enterprise includes a message processor and a data processor. The message processor receives message data including an income amount value, representing cash income received during a time period, an associated income source identifier, and a patient identifier. The income source identifier identifies a department internal to the healthcare enterprise providing the associated income amount value. The patient identifier identifies a patient. The data processor processes the received message data to identify an income account associated with the department based on the income source identifier, and updates the identified income account with the income amount value to indicate the income amount value received by the identified income account during the time period. The data processor identifies a patient account associated with a patient based on the patient identifier, and updates the patient account with the income amount value to indicate the income amount received by the patient account during the time period. The data processor collates and combines data from the income accounts and the patient accounts to provide a first income amount total value and/or a second income total value, respectively, representing combined cash income for the departments and for the patients, respectively, during the time period.

This aspect and other aspects of the present invention are further described with reference to the following detailed description and the accompanying figures, wherein the same reference numbers are assigned to the same features or elements illustrated in different figures. Note that the figures may not be drawn to scale. Further, there may be other embodiments of the present invention explicitly or implicitly described in the specification that are not specifically illustrated in the figures and visa versa.

DETAILED DESCRIPTION OF THE PREFERRED EMBODIMENTS

Figure 1:
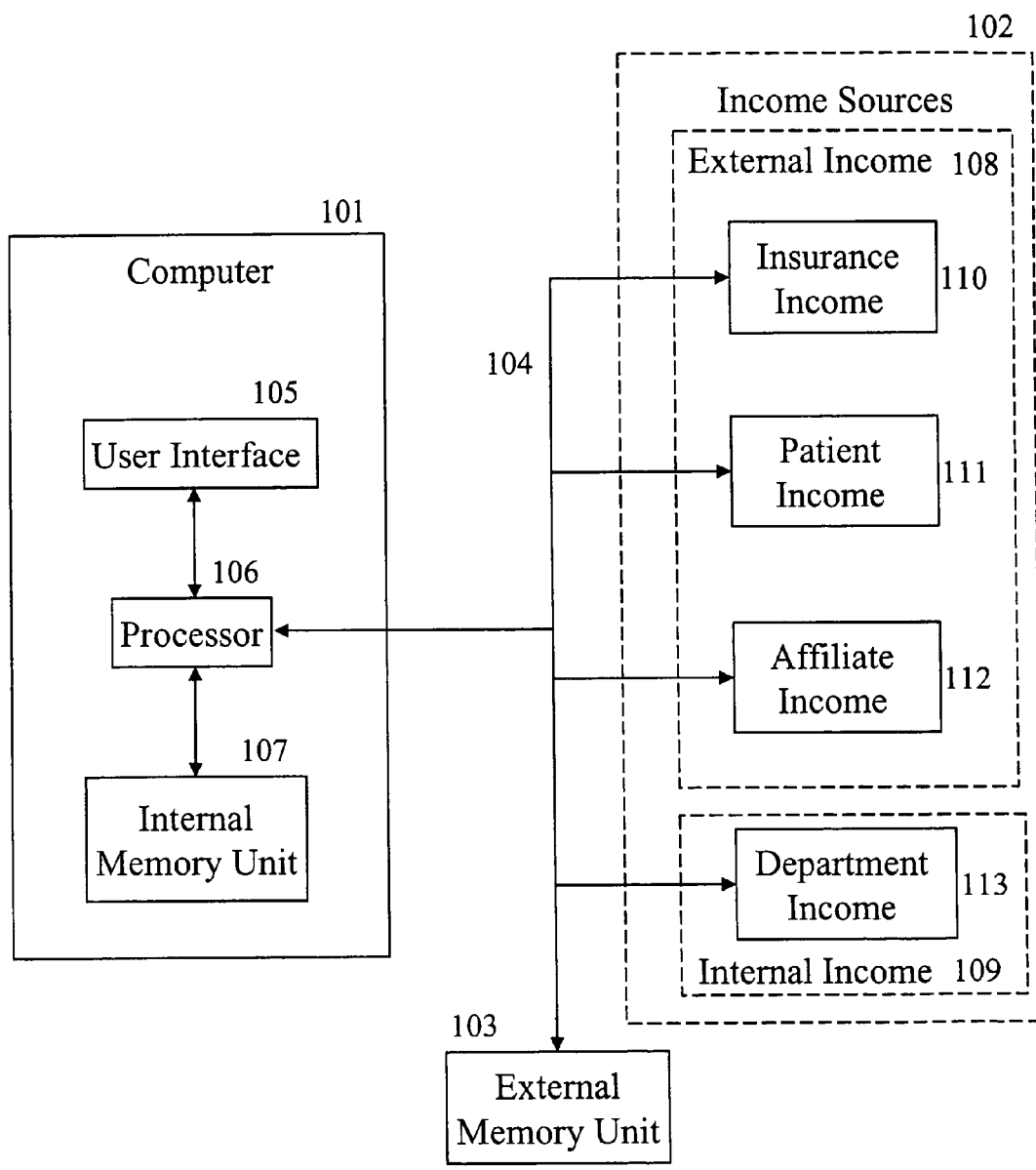
FIG. 1 illustrates a healthcare cash management accounting system, in accordance with a preferred embodiment of the present invention.

FIG. 1 illustrates a healthcare cash management accounting system 100, in accordance with a preferred embodiment of the present invention. The system 100 generally includes a computer 101, income sources 102, an external memory unit 103, and a communication path 104. The computer 101 further includes a user interface 105, a processor 106, and an internal memory unit 107. The income sources 102 further include external income sources 108 and internal income sources 109. The external income sources 108 include, without limitation, insurance income 110, patient income 111, and affiliate income 112. The internal income sources 109 include, without limitation, department income 113.

The system 100 is intended for use by a healthcare provider that is responsible for monitoring the health and/or welfare of people in its care. Examples of healthcare providers include, without limitation, a hospital, a nursing home, an assisted living care arrangement, a home health care arrangement, a hospice arrangement, a critical care arrangement, a health care clinic, a physical therapy clinic, a chiropractic clinic, a doctor's office, and a dental office. In the preferred embodiment of the present invention, the healthcare provider is a hospital. Examples of the people being serviced by the healthcare provider include, without limitation, a patient, a resident, and a client.

The computer 101 may be implemented as a personal computer, a server, a workstation, for example. The user interface 105, the processor 106, and the internal memory unit 107 are constructed and operate in a manner well known to those skilled in the art of the design of computers. The processor 106 may otherwise be called a message processor and/or a data processor.

The user interface 105 generally includes an input device (not shown) that permits a user to input information into the computer 101 and an output device (not shown) that permits a user to receive information from the computer 101. Preferably, the input device is a keyboard, but also may be a touch screen, a microphone with a voice recognition program, for example. Preferably, the output device is a display, but also may be a speaker, for example. The output device provides information to the user responsive to the input device receiving information from the user or responsive to other activity by the computer 101. For example, the display presents information responsive to the user entering information in the computer 101 via the keypad.

The external memory unit 103 stores accounting data, as well as other information for the system 100. Preferably, the external memory unit 103 is separate from the computer 100 to permit multiple users to have access to the accounting data in the external memory unit 103 from multiple sources. Preferably, the external memory unit 103 is separate from the computer 100 because of the physical size of the memory required to store the desired information. The external memory unit 103 may be implemented as read only memory (ROM), such as on a compact disk (CD) or on a hard drive, or a random access memory (RAM), and the like, as is well know to those skilled in the art of data storage units. Alternatively, the accounting data may be stored in the internal memory unit 107 in the computer 100, as the memory size becomes physically smaller, increases capacity, and becomes less expensive. Additional considerations include advantages and disadvantages of having the accounting data stored in a single centralized memory unit or stored in several decentralized memory units among the computer 100, the external memory unit 103, and the income sources 102.

The communication path 104 provides a communication network among the computer, the external memory unit 103, and the income sources 102. The communication path 104 may be implemented using any type of network including, without limitation, a local area network (LAN) and a wide area network (WAN). Preferably, the communication path 104 is adapted to use one or more data formats, otherwise called protocols, depending on the type and/or configuration of the various elements in the system 100. Examples of the data formats include, without limitation, an RS232 protocol, an Ethernet protocol, a Medical Interface Bus (MIB) compatible protocol, an Internet Protocol (I.P.) data format, a local area network (LAN) protocol, a wide area network (WAN) protocol, an IEEE bus compatible protocol, and a Health Level Seven (HL7) protocol.

The I.P. data format, otherwise called an I.P. protocol, uses IP addresses. Examples of the I.P. addresses include, without limitation, Transmission Control Protocol Internet Protocol (TCPIP) address, an I.P. address, a Universal Resource Locator (URL), and an electronic mail (Email) address.

The communication path 104 may be formed as a wired or wireless (W/WL) connection or a combination thereof. Preferably, the communication path 104 is formed as a wired connection. In the case of a wired connection, the I.P. address is preferably assigned to a physical location of the termination point of the wire, otherwise called a jack. The jack is mounted in a fixed location near the location of the various elements. In the case of a wireless connection, I.P. addresses are preferably assigned to the various elements, since the various elements would be mobile. The wireless connection permits the person using the system 100 to be mobile beyond the distance permitted with the wired connection.

The income sources 102 represent various ways that a healthcare enterprise generates income related to the health and/or welfare of people in the care of a healthcare enterprise. The income sources 102 may provide income to the healthcare enterprise manually or automatically. For manually provided income, a person manually collects the income at the income source, and the same or different person manually enters it in to the computer 101. For automatically provided income, income is manually or automatically collected at the income source and is manually or automatically entered into the computer 101. For automatically provided income, the income source 102 is implemented as a computer or computerized cash register. For example, in addition to physical cash transactions that transpire daily, healthcare facilities sometimes receive money that is automatically deposited directly into their bank account and is not received over the counter in person. This income could be in the form of electronic payments from patients or insurance companies, wire transfer monies from other affiliates, lock box deposits, and credit card reimbursements, etc. Entering these amounts into the cash register on the day they are received and then deducting the cashless totals balances to the actual cash deposit.

The income sources 102 may be external or internal to the healthcare enterprise. External income sources 108 represent income that comes from an entity that is separate from the healthcare enterprise. The term "separate" may represent legal, physical, and/or financial separation, for example. Internal income sources 109 represent income that comes from an entity that is included as a part of the healthcare enterprise. The term "included" may represent legal, physical, and/or financial inclusion, for example.

External income sources 108 include, without limitation, a health maintenance organization (HMO), an insurance company, a patient, a debt collection agency, and another healthcare provider enterprise. Insurance income 110 represents income that is provided to a healthcare enterprise as a reimbursement for a submitted insurance claim made on behalf of a patient for healthcare services and/or good provided to the patient by the healthcare enterprise. Preferably, the insurance income 110 represents multiple insurance companies remitting payments to the healthcare enterprise. Patient income 111 represents out-of-pocket co-payments and deductibles made by the patient to the healthcare enterprise for healthcare services and/or good provided to the patient by the healthcare enterprise. Typically, the out-of-pocket co-payments and deductibles represent the patient's payment portion of the insurance claim. The affiliate income 112 represents income from other entities affiliated with the healthcare enterprise such as physician practices, foundations, education, and research, for example.

Internal income sources 109 include, without limitation, various department associated with a healthcare enterprise such as: a cafeteria, a garage, a shop, a pharmacy, a cafe or restaurant, a cashiers office, a clinical department, an outpatient department, an inpatient department, an imaging department, and a laboratory. The departmental income 113 represents income received by an internal income source 109 of the healthcare enterprise.

Preferably, the income sources 102 have cash register like functions to manage income for a healthcare enterprise, such as a hospital. The cash register like functions include cash register cash controls and income categorizing capabilities.

Preferably, keys on a cash register are programmed to display the hospitals income categories received from the various income sources such as insurance payers (e.g., Medicare or Blue Cross), HMO's, third party payers, bad debt agency payments, patient payments, etc., and any other type of income that the facility would want to track.

Internally, the healthcare enterprise financially accounts for daily income by creating journal entries for the cash transactions. The system creates journal entries for the transactions by programming electronic cash registers for the healthcare enterprise. The system 100 advantageously employs cash registers programmed with general ledger account numbers for the healthcare enterprise so that the total amount of the cash received from a particular income source 102 (e.g., via a cash register key) can be tracked. The system 100, preferably in response to a user command, compiles the general ledger account numbers into a file, forming a general ledger file, that generates automatic transactions to post journal entries to the healthcare enterprise's general ledger accounting system. For example, the system 100 posts a debit entry to the cash account and posts a credit entry to the general ledger account number associated with the income source/cash register key.

Generally, a general ledger is the core of a company's financial records. These constitute the central "books" of the company's financial system, and every transaction flows through the general ledger. These records remain as a permanent track of the history of financial transactions during the life of the company. General ledger accounts represent corresponding income sources.

The accounting system may have a number of subsidiary ledgers (called sub-ledgers) for items such as cash, accounts receivable, and accounts payable. Each subsidiary ledger further includes general ledger accounts. Entries that are entered (i.e., posted) to the sub-ledgers transact through the general ledger account. For example, when a credit sale posted in the account receivable sub-ledger turns into cash due to a payment, the transaction is posted to the general ledger and the two subledgers (i.e., cash and accounts receivable) as well.

There may be times when items will go directly to the general ledger without any sub-ledger posting. These are primarily capital financial transactions that have no operational sub-ledgers. These may include items such as capital contributions, loan proceeds, loan repayments (e.g., principal), and proceeds from sale of assets. Typically, these items are linked to the balance sheet but not to the profit and loss statement.

The system 100 also has the capability to disburse refunds, calculate discounts, and reverse transactions, etc. For example, sometimes hospitals receive non-sufficient funds return checks that need to be accounted for by reversing the initial transaction.

A healthcare enterprise may have several entities (e.g., facilities) that need to report their financial status as individual entities, and at a corporate or other level of the enterprise. For this purpose, the system 100 employs electronic cash registers in each hospital, such as the cashier's area, where the departments have a centralized place to make deposits. At each month's end, each facilities income data is pulled from the cash registers at each entity to produce a combined entity report that indicates the cash income totals for the system 100 as a whole. Hence, the cash register solution incorporates a secure and controlled cash process that is implemented with minimal expense for one or more entities.

Figure 2:
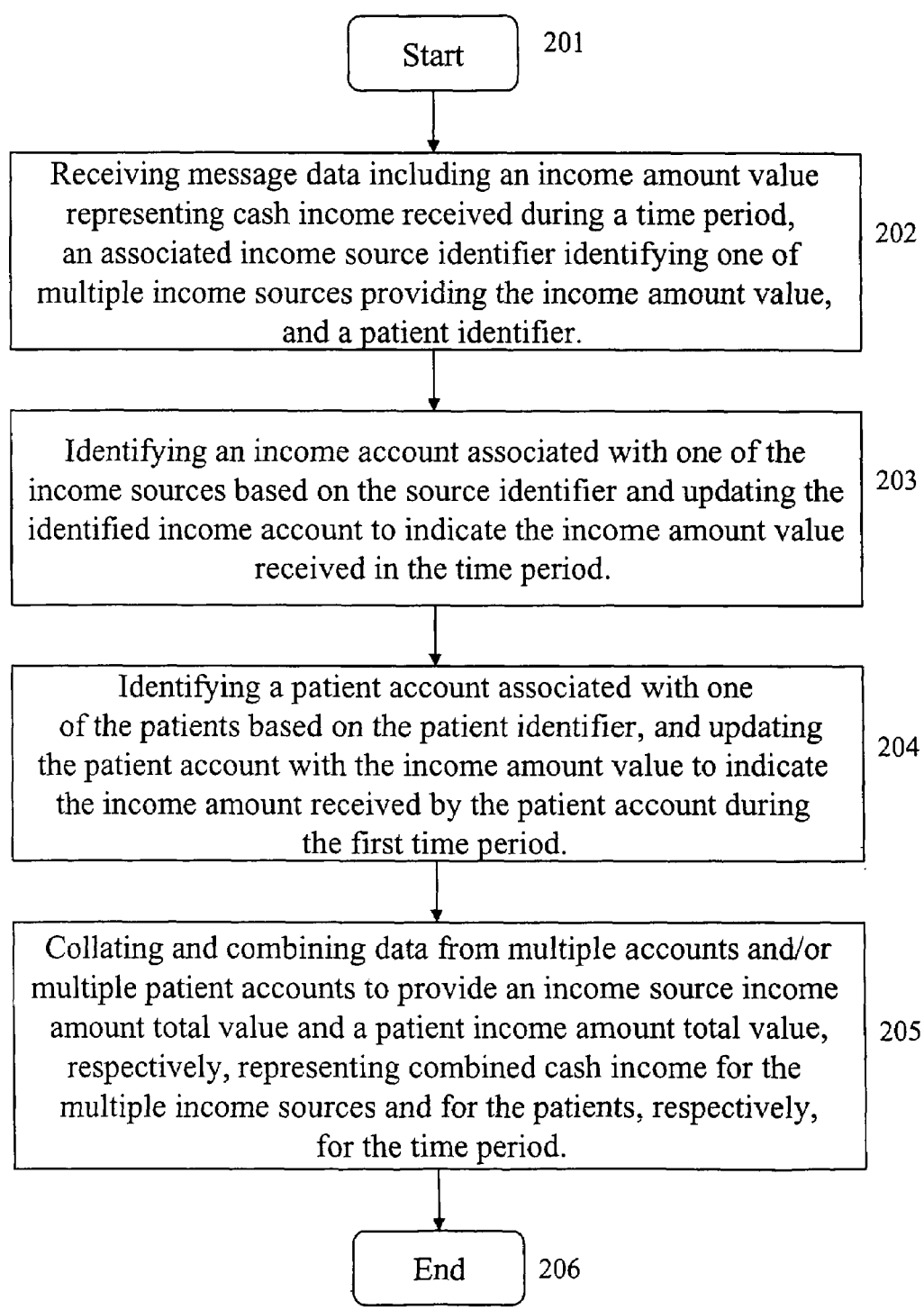
FIG. 2 illustrates a healthcare cash management accounting process for the system, as shown in FIG. 1, in accordance with a preferred embodiment of the present invention.

FIG. 2 illustrates a healthcare cash management accounting process 200 for the system 100, as shown in FIG. 1, in accordance with a preferred embodiment of the present invention. The system 100 may perform the process 200 for one or more income sources 102, either external to and/or internal to the healthcare enterprise.

At step 201, the process starts.

At step 202, the system 100 receives message data including an income amount value representing cash income received during a time period, an associated income source identifier identifying one of multiple income sources 102 providing the income amount value, and a patient identifier. Preferably, the received message data is derived from a processing device, providing cash register functions, associating a user selected source identifier with the income amount value. Preferably, the income amount value includes a total income received by one of the multiple income sources 102 during the time period. Preferably, the patient identifier identifies one of the patients.

Preferably, the message data identifies individual cash transactions performed during the time period and associated with the healthcare enterprise income source 102, and the income amount value includes a total transaction income amount value for the time period. Preferably, a transaction income amount value includes a disbursement including a negative income amount value.

Preferably, the message data comprises a file, and an individual message is conveyed within said file. Alternatively, the message data may include individual messages, network messages for individual transactions, networked messages for groups of transactions, and the like. Preferably, an individual cash transaction includes an electronic funds transfer.

Preferably, the message data identifies individual cash transactions performed during the time period and associated with the healthcare enterprise department, and the income amount value includes a transaction income amount value. Preferably, the processor 106 accumulates individual cash transaction income amount values for transactions performed during the time period for the healthcare enterprise income source 102 to provide a cumulative total value for the time period.

Preferably, the processor 106 updates an account for the overall healthcare enterprise in response to the income amount total value representing combined cash income for the income sources for the time period. The processor 106 further updates an account for multiple healthcare enterprises including the healthcare enterprise in response to the income amount total value representing combined cash income for the income sources 102 for the time period.

Preferably, the processor 106 initiates generation of a report identifying one or more of: a total income received by individual income sources 102 during the time period, a total income received by individual income sources 102 during the time period deposited in a bank, and individual cash transactions performed during the time period by individual income sources 102.

Preferably, the time period includes one or more of: a day, a week, a month, and a year Preferably, the income sources 102 internal to the healthcare enterprise include one or more of: a cafeteria, a garage, a shop, a pharmacy, a café or restaurant, a cashiers office, a clinical department, an outpatient department, an inpatient department, an imaging department, and a laboratory.

At step 203, the system 100 identifies an income account associated with one of the income sources based on the income source identifier, and updates the identified income account with the first income amount value to indicate the income amount value received by the identified income account during the time period. Preferably, the source identifier incorporates an account number identifying the account associated with the one of the income sources 102.

At step 204, the system 100 identifies a patient account associated with one of the patients based on the patient identifier, and updates the patient account with the income amount value to indicate the income amount received by the patient account during the first time period.

At step 205, the system 100 collates and combines data from multiple income accounts and/or multiple patient accounts to provide an income source income amount total value and a patient income amount value, respectively, representing combined cash income for the multiple income sources and for the multiple patients, respectively, during the time period.

Several alternatives exist for a healthcare enterprise to track cash income from a particular patient and/or medical insurance reimbursement income, from one or more medical insurance companies, alone or in combination for individual departments/organizations or by the healthcare enterprise as a whole. Any combination of the above data, and including other data mentioned herein, may be determined for various accounting and business purposes. The following examples provide several alternatives.

In one example, the received message data identifies medical insurance reimbursement income amounts for multiple patients. An individual message data item includes a medical insurance reimbursement income amount value and an associated patient identifier. The patient identifier identifies one of multiple patients providing the associated medical reimbursement income amount. The system 100 identifies an income account associated with one of the patients based on the patient identifier, and updates the identified income account to indicate the medical insurance reimbursement income amount value received. This alternative advantageously permits a healthcare enterprise to track both cash transactions contributed by individual patients and medical insurance reimbursement income contributed on behalf of individual patients. Tracking both the cash and insurance income components is important for the healthcare enterprise to accurately measure their income against their expenses for the first time period.

In another example, the system 100 combines said transaction income amount value received with the medical insurance reimbursement income amount value received for one of the patients, and updates the identified account to indicate the combined amount. This alternative advantageously permits a healthcare enterprise to track medical insurance reimbursement income for a single patient.

In yet another example, the received message data identifies a single medical insurance reimbursement income amount for multiple patients, and identifies a source organization of the reimbursement income amount. The system 100 identifies an organization income account associated with the source organization, and updates the organization income account to indicate the medical insurance reimbursement income amount value received. This alternative advantageously permits a healthcare enterprise to track medical insurance reimbursement income for multiple patients by organization.

Using the method describe in FIG. 2, the system 100 electronically tracks and controls the cash received to advantageously permit efficient, timely, secure, automated, and accurate processing of the cash data for the healthcare enterprise.

At step 206, the process ends.

Figure 3:
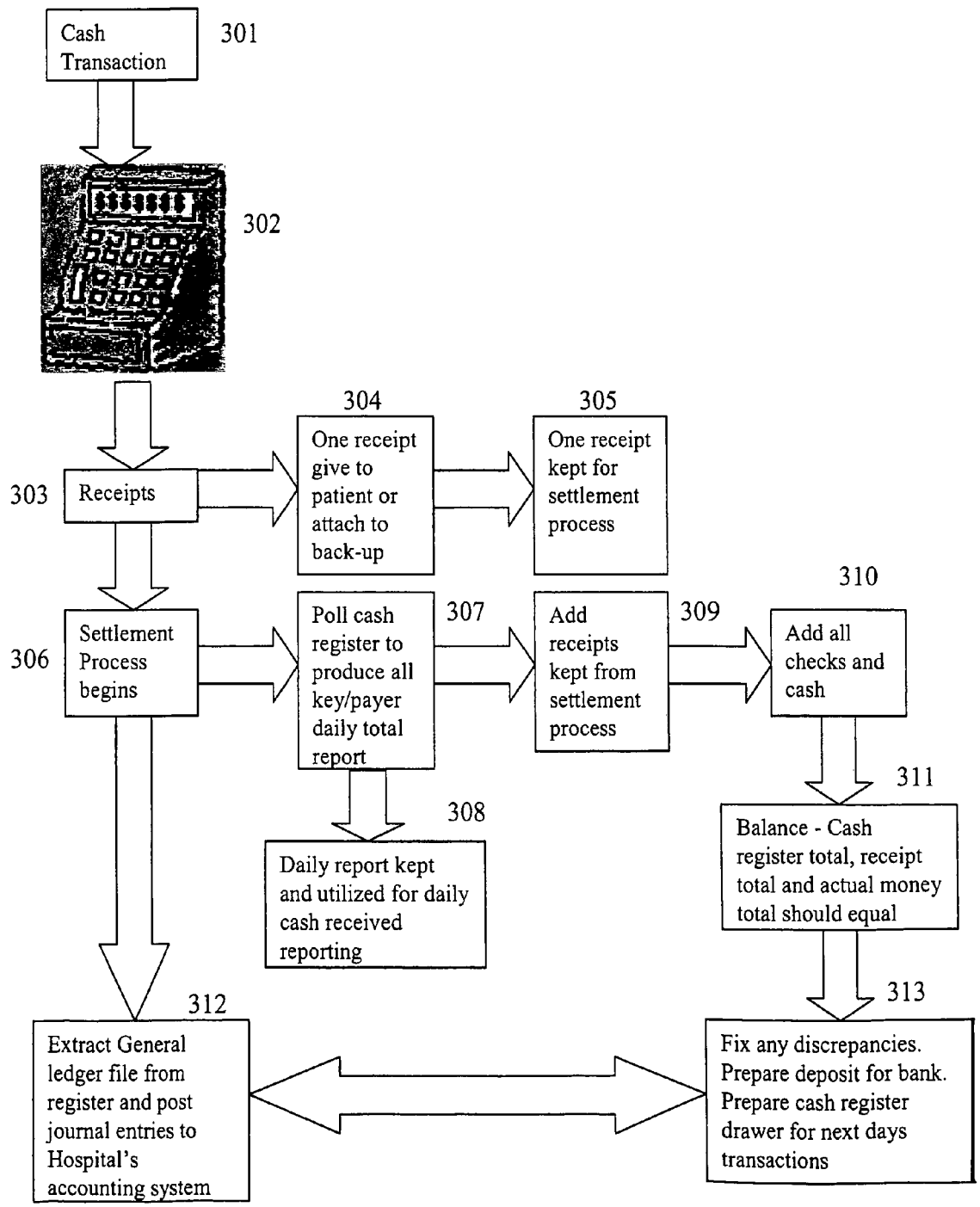
FIG. 3 illustrates a healthcare collection and settlement process for a single income source for the system, as shown in FIG. 1, in accordance with a preferred embodiment of the present invention.

FIG. 3 illustrates a healthcare collection and settlement process 300 for a single income source 102, in accordance with a preferred embodiment of the present invention. Preferably, the process 300 occurs on a daily basis, but may occur at any time interval, including each transaction. Preferably, the process 300 is performed automatically by the system 100 using cash registers and/or computers, but may be performed fully or partly manually, with human intervention, if required or desired. An analogous process also applies for multiple income sources 102.

At step 301, the system 100 engages in a cash transaction on behalf of the healthcare enterprise. The income system 100 associated with the healthcare enterprise receives the cash.

At step 302, the system 100 receives the cash transaction into the cash register responsive to engaging in the cash transaction.

At step 303, the system 100 generates at least two receipts for the cash transaction at the income source 102 responsive to receiving the cash transaction into the cash register. Preferably, the receipts are automatically generated by a cash register.

At step 304, the system 100 provides one receipt to the person or entity, such as the patient, providing the income. Alternatively, the receipt may be used as a back-up receipt.

At step 305, the system 100 retains one receipt for a settlement process, otherwise known as a balancing or a reconciliation process.

At step 306, the system 100 begins the settlement process.

At step 307, the system 100 polls (i.e., requests) that the cash registers generate a total report for the day for individual transactions and for totals of each income source (e.g., cash register key).

At step 308, the system 100 keeps and uses the total report for the day for reporting the amount of cash received for the day.

At step 309, the system 100 adds the receipts kept for the settlement process.

At step 310, the system 100 adds checks and cash.

At step 311, the system 100 balances the total income received by income source 102, the total receipts generated by the income source 102, and the actual money received by the income source 102.

At step 312, the system 100 extracts a general ledger file from the cash register and posts journal entries to the healthcare enterprise's general ledger accounting system. Preferably, the general ledger file includes electronic data representing the cash transactions.

At step 313, the system 100 fixes and discrepancies between the general ledger file and the balances, prepares a deposit for the bank, and prepares cash register drawer for the cash transactions for the next day.

Figure 4:
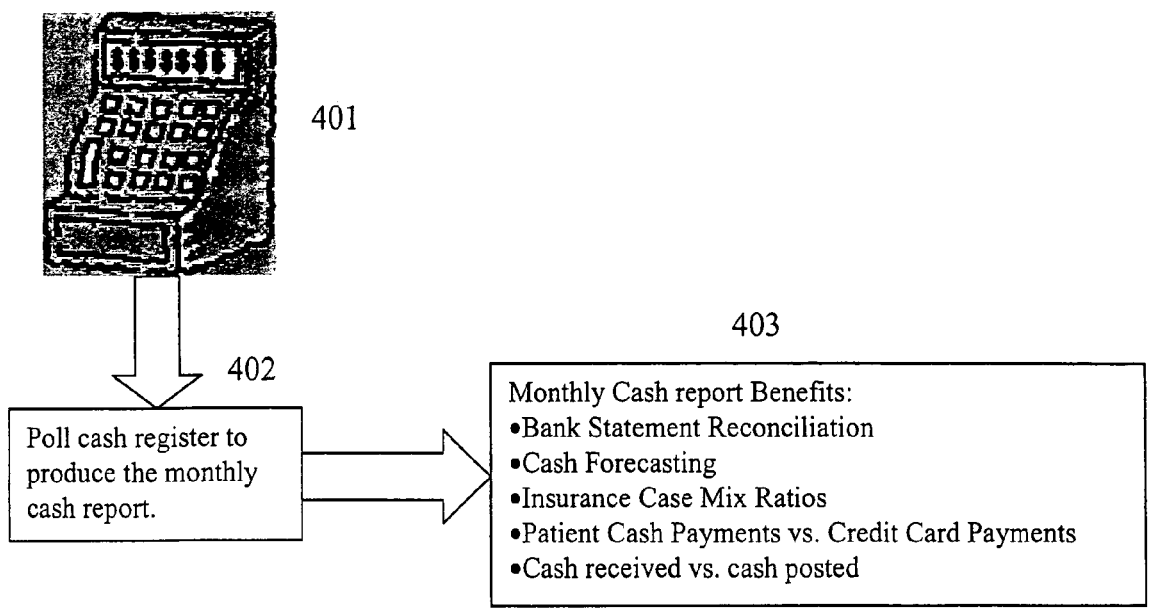
FIG. 4 illustrates a month end cash reporting process for a single income source for the system, as shown in FIG. 1, in accordance with a preferred embodiment of the present invention.

FIG. 4 illustrates a month end cash reporting process 400 for a single income source 102, in accordance with a preferred embodiment of the present invention. Preferably, the process 400 occurs at a monthly time interval, but may occur at any interval, including each transaction. Preferably, the process 400 is performed automatically by the system 100 using cash registers and/or computers, but may be performed fully or partly manually, with human intervention, if required or desired.

At step 401, the system 100 receives cash transactions into the cash register responsive to engaging in each cash transaction.

At step 402, the system 100 polls (i.e., requests) that the cash registers produce a cash report for the month. Preferably, the cash report for the month is based on daily cash totals. Preferably, the monthly report includes the month end totals of each individual income source 102 (e.g., cash register key).

At step 403, the system 100 uses the cash report for the month for various benefits including, without limitation, bank statement reconciliation, cash forecasting, evaluating insurance case mix ratios, evaluating patient cash payments versus credit card payments, and evaluating cash received versus cash posted. The month end cash that is not posted is needed to establish actual account receivables calculations for each day. Monthly bank reconciliation is efficient because daily cash received is equal to the deposit amount listed on the bank statement.

Figure 5:
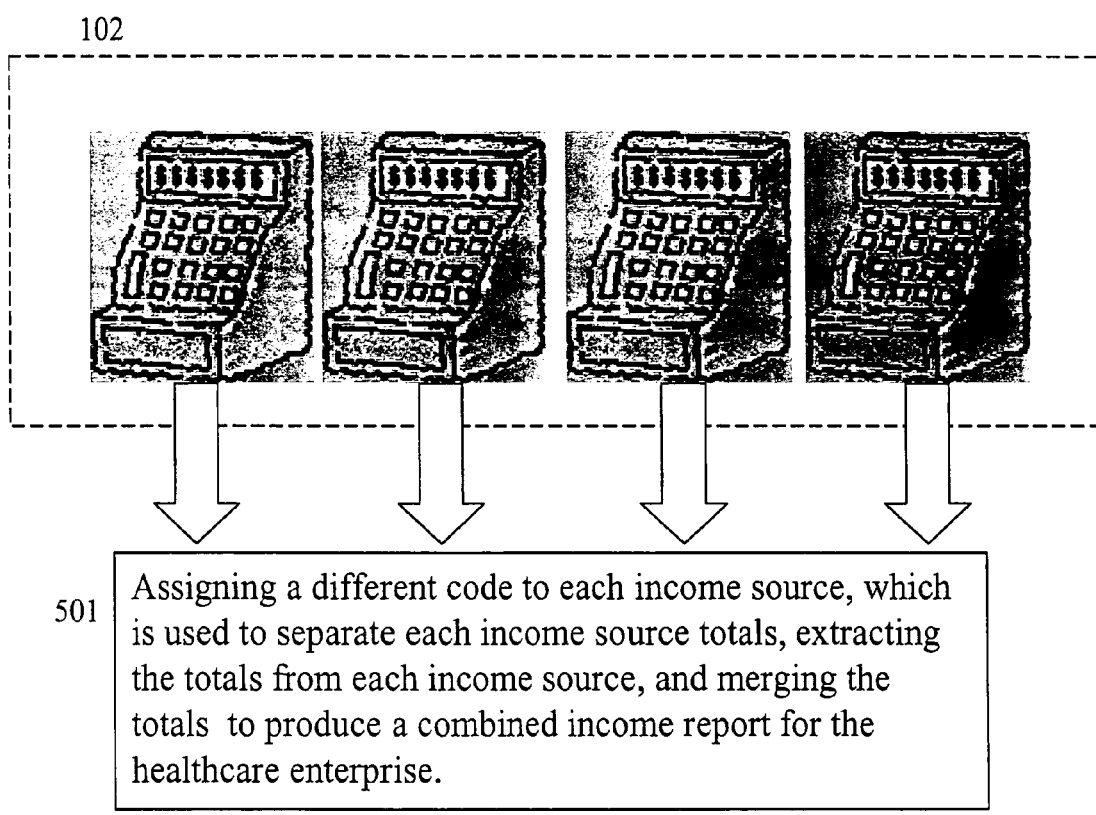
FIG. 5 illustrates a month end cash reporting process for multiple income sources for the system, as shown in FIG. 1, in accordance with a preferred embodiment of the present invention.

FIG. 5 illustrates a month end cash reporting process 500 for multiple income sources 102, in accordance with a preferred embodiment of the present invention. Preferably, the process 500 occurs at a daily time interval, but may occur at any interval, including each transaction. Preferably, the process 500 is performed automatically by the system 100 using cash registers and/or computers, but may be performed fully or partly manually, with human intervention, if required or desired.

At step 501, the system 100 assigns a different code to each income source 102, which is used to separate each income source totals. The system extracts the totals from each income source 102. The system 100 merges the totals to produce a combined income report for the healthcare enterprise.

An example of the operation of the system 100 using the processes 200, 300, 400, and 500 is provided as follows. A cash register accepts individual income totals into the same cash register key. During the settlement process, the system 100 totals each individual cash register key separately. After everything is balanced, the system 100 creates a file to apply the cash journal entry to the hospital's general ledger system on a daily basis. The total of income corresponding to the cash register keys forms a cash debit accounting journal entry, and the income corresponding to each individual cash register key total forms a credit accounting journal entry to the hospital's accounting system.

During normal business hours, patients make payments to the hospital cashier for their bills. For example, Ms. Mary Patient gives the hospital cashier $150.00 to pay her bill. The cashier enters (i.e., rings) $150.00 into cash register key number one on the cash register. The cashier gives Mary a receipt for the cash transaction. Another patient comes to the cashier window and pays $200.00 on his bill. Again, the cashier rings the $200.00 into cash register key number one on the cash register. The cashier gives the other patient a receipt for the $200.00 cash transaction. At the same time, the cashier receives bulk insurance payment checks from various payers, and performs the same process of ringing the amounts into the appropriate register cash register keys corresponding to the name of the payer. Now it is time to perform a settlement process to balance cash and make the daily cash deposit for that day. The cashier polls the cash register to produce the totals of each cash register key. The settlement process takes place by counting the checks and cash received, and making sure that it equals the cash register key totals.

Table 1, shown below, illustrates the cash register totals, after cashier polls the cash register for the settlement process.

TABLE 1

| Department Key | Account Name | Account Number | Dollar Amount |
|---|---|---|---|
| 1 | Patient Payments | 161-0021-0054 | $350.00 (1) |
| 2 | Insurance Payment | 161-0021-0124 | $125,000.00 |
| 3 | Medicare | 161-0021-1256 | $1,300,000.00 |
| 4 | Blue Cross | 161-0021-5689 | $575,000.00 |
| 5 | HMO | 161-0021-8654 | $650.00 |
| | | | $2,001,000.00 (2) |

Wherein:
(1) This amount is the total of the $150.00 plus the $200.00 payments made by the patients.
(2) This amount must equal the cash and check total on settlement.

Table 2, shown below, illustrates contents of a file that is extracted from the cash register during the settlement process, and is sent to the hospital's general ledger system.

TABLE 2

| Account Name | Account No. | Amount |
|---|---|---|
| Debit | | |
| Cash Account | 161-00210001 | 2,001,000.00 |
| TOTAL DEBIT AMT = $2,001,000.00 | | |
| Credit | | |
| Patient Payments | 161-0021-0054 | $350.00 |
| Insurance Payment | 161-0021-0124 | $125,000.00 |
| Medicare | 161-0021-1256 | $1,300,000.00 |
| Blue Cross | 161-0021-5689 | $575,000.00 |
| HMO | 161-0021-8654 | $650.00 |
| TOTAL CREDIT AMT = $2,001,000.00 | | |

The following text describes additional cash register functions for posting payments including processing payments. As described above, approximately eighty percent (80%) of a hospital's income is received from medical insurance reimbursement and patient out-of-pocket co-payments and deductibles. Various types of payments make up the 80% of a healthcare facility's income. Typical volume of payments that a healthcare facility could receive on a daily basis and the characteristics of how they are received are also described.

Healthcare enterprises operate differently than most service businesses. Typically, most employers or government agencies, being the main providers for healthcare insurance, offer few choices of healthcare coverage to their employees. Further, there are not that many medical insurance carriers supporting those employers or government agencies. Therefore, large groups of people are likely to have the same medical insurance carrier. This business environment causes the healthcare enterprises to bargain for reimbursements from the medical insurance carriers and to establish contracts with medical insurance carriers to receive payments for their services.

Medical insurance reimbursements to the healthcare facility are usually received in bulk payment remittances. This means that the larger insurance companies, for example, * (AETNA USHC), * (CIGNA), Blue Cross, etc., send a healthcare provider one check attached with a remittance advice that lists several insurance reimbursement payments for the accounts of various patients. For example, a healthcare provider receives an AETNA USHC check (i.e., one check) and remittance advice that contained sixty-five (65) payments for different patients. Using the cash register, business office staff for the healthcare provider inputs the one AETNA USHC check total into the appropriate cash register key (e.g., key #3 for AETNA USHC). Since this check is for sixty-five (65) different accounts, it is typically too burdensome to input each payment for each patient into the cash register. After the check is deposited and accounted for, business office staff for the healthcare provider applies each payment that is listed on the AETNA USHC remittance advice to each of the sixty-five (65) individual patient accounts. Because of the contractual agreements between the healthcare provider and AETNA USHC, contractual allowances also may be taken on each one of these sixty-five (65) payments, as well as posting the payment itself. Since, healthcare providers typically receive several bulk payment checks in one day from other large medical insurance companies, the healthcare providers may not have enough time and/or staff to process (e.g., to deposit and post to accounts) the remittance advices in the same day that the payment checks are received.

An analogous bulk payment process may also be used for payments received from patients. A healthcare provider sets up a lock box with its bank. The lock box at the bank receives payments that are mailed directly to the bank by the patient to permit the money to be deposited into the healthcare provider's bank account the same day as when received. The bank sorts the payments (e.g., usually, into batches of sixty (60) to eighty (80) payments), and sends statement vouchers to the healthcare provider to identify the accounts for the patients that shall be credited with the payments. Although this method of bulk payment processing is similar to the medical insurance remittances, the transaction of posting the contractual allowances is not needed when posting patient payments.

Alternatively or in addition thereto, patients may also pay their co-payments and deductibles while they are at the healthcare provider's facility to receive healthcare service. For these types of payments, the system 100 uses an additional function. When a cashier accepts the patient's payment and inputs the transaction into the cash register two things happen. After the settlement process when the cash is balanced, the cash register produces one file (or one or more messages, for example) that interfaces to the healthcare provider's general ledger accounting system, which posts the appropriate journal entries for that day. The system 100 creates another file that distinguishes and stores the individual patient payment transactions as they are entered into the register. The system 100 also creates a posting transaction within the file that interfaces to the healthcare provider's patient accounting system (e.g., accounts receivable) and automatically applies the payments. The posting transaction file may be hard coded, contained in software that may be updated, or in another form of instruction, and may be located either remotely (e.g., in a server) or locally (e.g., in a client). The file captures the dollar amount and patient account number that identifies the amount paid on the bill and where to post the payment. On a daily basis, the system 100 uploads the cash-posting file to the patient accounting system, posts the payments to the patients accounts, and uploads the general ledger accounting file to the healthcare provider's general ledger accounting system to post the journal entries.

In summary of the preferred embodiment of the present invention, the system 100 produces a secure and automated workflow process to account for the daily revenue activities that occur for a healthcare enterprise. The system 100 includes a revenue workflow process, which incorporates an electronic cash register that has been programmed with additional functions to facilitate a method of collecting payments, balancing cash, accounting for the transactions, and reporting for a single or multi-entity healthcare enterprise.

Hence, while the present invention has been described with reference to various illustrative embodiments thereof, the present invention is not intended that the invention be limited to these specific embodiments. Those skilled in the art will recognize that variations, modifications, and combinations of the disclosed subject matter can be made without departing from the spirit and scope of the invention as set forth in the appended claims.

What is claimed is:

1. A method of automatic cash accounting for use in a hospital, comprising the activities of:
   receiving, via a message processor first message data including a first income amount total value, representing cash income received during a first time period, and an associated first income source identifier identifying one of a plurality of departments internal to said hospital providing said associated first income amount total value;
   receiving, via said message processor, second message data identifying medical insurance reimbursement income amounts received for services rendered to multiple patients during said first time period; and
   automatically processing, via a data processor, said first and second received message data by,
   identifying an income account associated with said one of said departments based on said first income source identifier, and for updating said identified income account with said first income amount total value to indicate said first income amount total value received by said identified income account during said first time period,
   collating and combining data representing total values from a plurality of income accounts to provide a first income amount cumulative total value representing combined cash income total value for all of said departments during said first time period and
   combining said reimbursement income amounts with said cash total value for said departments during said first time period to provide a total amount, and
   creating a financial statement record using said total amount during said first time period.

2. A method according to claim 1, further comprising the activities of
   deriving at least one of said first and second received message data from a processing device associating a user selected income source identifier with said first income amount total value; and providing cash register functions at said processing device.

3. A method according to claim 1, wherein
the second message data received in said activity of receiving second message data includes a medical insurance reimbursement income amount value for services rendered to a particular patient and an associated patient identifier, and
wherein said activity of automatically processing, further comprises the activity of,
identifying an income account associated with said patient based on said patient identifier, and updates said identified patient income account to reflect said medical insurance reimbursement income amount value received and
creating said financial statement record using said combined cash income total value and data derived from said patient income account.

4. A method according to claim 1, wherein
said first received message data identifies a plurality of individual cash transactions performed during said first time period and associated with a hospital department, and said first income amount total value comprises a total transaction income amount value for said first time period.

5. A method according to claim 4, wherein
a transaction income amount value comprises a disbursement comprising a negative income amount value.

6. A method according to claim 4, wherein
at least one of said first and second received message data comprises a file and
an individual cash transaction comprises an electronic funds transfer.

7. A method according to claim 1 wherein
the second message data received during said activity of receiving second message data identifies an individual message data item includes a medical insurance reimbursement income amount value and an associated patient identifier, and wherein
said activity of automatically processing said received message data includes identifying an income account associated with said one of said patients based on said patient identifier, and updates said identified income account to indicate said medical insurance reimbursement income amount value received and, wherein
said activily of creating said financial statement record includes using said combined cash income total value and data derived from said patient income account.

8. A method according to claim 1, wherein
said first received message data identifies a plurality of individual cash transactions performed during said first time period and associated with a hospital department, and said first income amount total vaLue comprises a transaction income amount value, and
said activity of automatically processing includes accumulating a plurality of individual cash transaction income amount values for transactions performed during said first time period for said hospital department to provide a cumulative total value for said first time period.

9. A method according to claim 1, wherein
said source identifier incorporates an account number identifying said income account associated with said one of said departments.

10. A method according to claim 1, wherein
said activity of automatically processing includes data processor updates an account for the overall hospital in response to said first income amount total value representing cornbined cash income for said departments for said first time period.

11. A method according to claim 10, wherein
said activity of automatically processing further includes updating an account for a plurality of hospitals including said hospital in response to said first income amount total value representing combined cash income for said departments for said first time period.

12. A method according to claim 1, wherein
said financial statement record identifies at least one of, (a) a total income received by individual departments of said plurality of departments during said first time period, (b) total income received by individual departments of said plurality of departments during said first time period deposited in a bank, and (c) individual cash transactions performed during said first time period by individual hospital departments.

13. A method according to claim 1, wherein
said first time period comprises at least one of: (i) a day, (ii) a week, (iii) a month, and (iv) a year, and
said plurality of departments internal to said hospital include at least two of, (a) a cafeteria, (U) a garage, (c) a shop, (d) a pharmacy, (e) a cafd or restaurant, (f) cashiers office, (g) a clinical depanment, (h) an outpatient department, (i) an inpatient department, (j) an imaging department, and (k) a laboratory.

14. A method of automatic cash accounting for use in a healthcare enterprise, comprising the activities of:
receiving, via a message processor, a plurality of messages corresponding to a plurality of individual cash transactions performed during a first time period and associated with a hospital department, arid an individual message includes a transaction income amount total value and an associated first source identifier identifying one of a plurality of departments internal to said hospital providing said associated transaction income amount value and a medical insurance reimbursement income amount value for services rendered to a particular patient and an associated patient identifier;
processing, via a data processor, said received plurality of messages for,
identifying an income account associated with said one of said departments based on said first income source identifier, and for updating said identified income account to indicate said transaction income amount total value received during said first period,
identifying an income account associated with said patient based on said patient identifier, and updating said identified patient income account to reflect said medical insurance reimbursement income amount value received
accumulating a plurality of individual cash transaction income amount total values for transactions performed during said first time period for said hospital department to provide a cumulative total value for said first time period,
collating and combining cumulative total values associated with a corresponding plurality of departments to provide a first income amount total value representing combined cash income for said departments during said first time period and
creating a financial statement record using said combined cash income total value for said departments during said first time period and data derived from said patient income amount.

15. A method according to claim 14, wherein
said received plurality of messages comprise a file, and said individual message is conveyed within said file.

16. A method of cash accounting for use in a hospital, comprising the activities of:
via a message processor,
receiving first message data including a first income amount total value determining income received during a first time period and an associated first source identifier, said first source identifier identifying one of a plurality of departments internal to said hospital providing said associated first income amount total value, and
receiving second message data including a second income amount total value determining income received during said first time period and an associated second source identifier, said second source identifier identifying one of a plurality of organizations external to said hospital providing said associated second income amount total value, wherein said second message data identifies medical insurance reimbursement income amounts for multiple patients; and
collating and combining, via a data processor, a plurality of first income amount total values from a corresponding plurality of departments to provide a first income amount cumulative total value representing combined cash income for said departments for said first time period, and for collating and combining a plurality of second income amount total values from a corresponding plurality of organizations to provide a second income amount cumulative total value representing combined cash income from said organizations for said first time period and
creating a financial statement record using said cumulative total value representing combined cash income for said departments and said second income amount cumulative total value for said first time period.

17. A method according to claim 16, wherein
said first time period comprises at least one of, (a) a day, (b) a week, (c) a month and (iv) a year, and
said plurality of departments internal to said hospital include at least two of, (a) a cafeteria, (b) a garage, (c) a shop, (d) a pharmacy, (e) a café or restaurant, (f) cashiers office, (g) a clinical department, (h) an outpatient department, (i) an inpatient department.

18. A method according to claim 16. wherein
further comprising combining said cumulative total value representing combined cash income for said departments and said second income amount cumulative total value for said first time period to derive a value representing combined cash income for said hospital during said first time period.

19. A method according to claim 17, wherein
said plurality of organizations external to said hospital include at least two organizations of, (a) a health maintenance organization (HMO), (h) an insurance company, (c) a patient, (d) a debt collection agency, (e) another healthcare provider enterprise.

20. A method according to claim 16, wherein
said first message data including said first income amount total value is received from at least one of, (a) a cash register, and (b) a processing device with cash register functions.

21. A method according to claim 17, wherein
an individual message data item includes a medical insurance reimbursement income amount value and an associated patient identifier, and
further comprising identifying an income account associated with said one of said patients based on said patient identifier, and updates said identified income account to indicate said medical insurance reimbursement income amount value received and
creating said financial statement record using data derived from said patient income account.

22. A method according to claim 16, wherein
said message data identifies a plurality of individual cash transactions performed during a first time period and associated with a hospital department, and said first income amount toral value comprises a total transaction income amount value during said first time period.

23. A method according to claim 22, wherein
a transaction income amount value comprises a disbursement comprising a negative income amount value.

24. A method according to claim 16, wherein
said received message data comprises a file.

25. A method for an automatic cash accounting system for use in a healthcare enterprise, comprising the activities of:
receiving, via a message processor, message data including a first income amount total value determining income received during a first time period and an associated first source identifier, said first source identifier identifying one of a plurality of departments internal to said hospital providing said associated first income amount total value, said message data also indicating a plurality of individual cash transactions performed during said first time period and associated with multiple patients, and an individual message data item includes a transaction income amount value and an associated transaction income source identifier, said transaction income source identifier identifying one of a plurality of patients providing said associated transaction income amount value;
identifying, via a data processor, an income account associated with said one of said patients based on said transaction income source identifier, and for updating said identified income account to indicate said transaction income amount value received by said identified income account during said first time period and creating a financial statement record usina said hospital department first income amount total value and said transaction income amount value for said first time period.

26. A method according to claim 25, wherein
said received message data comprises a file.

27. A method according to claim 25, furtlier comprising the activities of receiving second message dala identifying medical insurance reimbursement income amounts for multiple patients for services rendered to said multiple patients in said first time period and
identifying income accounts associated with said multiple patients based on said associated patient identifiers., and updating said identified income accounts to indicate said medical insurance reimbursement income amount value received.

28. A method according to claim 27,
further comprising combining said hospital department first income amount total value and said transaction income amount value and said medical insurance reimbursement income amounts for multiple patients in creating said financial statement record.

29. A method according to claim 25, further comprising the activities of receiving second message data identifying a single medical insurance reimbursement income amount for multiple patients, and identifying a source organization of said reimbursement income amount, and identifying an organization income account associated with said source organization, and updating said organization income account to indicate said medical insurance reimbursement income amount value received.

* * * * *